(12) United States Patent
Adachi et al.

(10) Patent No.: US 11,112,678 B2
(45) Date of Patent: Sep. 7, 2021

(54) CAMERA FOCUS ADJUSTMENT JIG AND CAMERA FOCUS ADJUSTMENT METHOD

(71) Applicant: HONDA MOTOR CO., LTD., Tokyo (JP)

(72) Inventors: Masakazu Adachi, Tochigi (JP); Junichi Matsumoto, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/781,530

(22) Filed: Feb. 4, 2020

(65) Prior Publication Data

US 2020/0301249 A1   Sep. 24, 2020

(30) Foreign Application Priority Data

Mar. 22, 2019   (JP) .............................. JP2019-054500

(51) Int. Cl.
  *G03B 13/32*   (2021.01)
  *G03B 43/00*   (2021.01)
  *G03B 17/56*   (2021.01)

(52) U.S. Cl.
  CPC ........... *G03B 13/32* (2013.01); *G03B 17/561* (2013.01); *G03B 43/00* (2013.01)

(58) Field of Classification Search
  CPC .................................................... G03B 43/00
  See application file for complete search history.

(56) References Cited

U.S. PATENT DOCUMENTS 5,329,469 A * 7/1994 Watanabe .............. B25J 9/1697
                                                                348/95
5,991,046 A * 11/1999 Shakespeare ...... G01N 21/8901
                                                                356/429

(Continued)

FOREIGN PATENT DOCUMENTS

JP   2001-036799 A       2/2001
JP   2001036799 A   *   2/2001

(Continued)

OTHER PUBLICATIONS

Office Action dated Dec. 15, 2020 issued in the corresponding Japanese Patent Application No. 2019-054500.

(Continued)

*Primary Examiner* — Clayton E. LaBalle
*Assistant Examiner* — Leon W Rhodes, Jr.
(74) *Attorney, Agent, or Firm* — Carrier Blackman & Associates, P.C.; William D. Blackman; Joseph P. Carrier (57) ABSTRACT

Provided is a camera focus adjustment jig (1) fixed to an inspection device and adjusting a focus of a camera (5), the inspection device including the camera (5) configured to photograph an automobile V, and a movable arm (3) to which the camera (5) is fixed via a fixing part (4) and configured to move the camera (5) to a photographing position where the automobile V is photographed. The camera focus adjustment jig (1) includes: a connection arm (6) connected to the fixing part (4); an adjusting unit (7) provided on the connection arm (6) and positioned, with respect to the camera (5), at a position equivalent to a position of the automobile V located at the photographing position; and display parts (9a, 9b) provided on a surface of the adjusting unit (7) facing the camera (5).

3 Claims, 6 Drawing Sheets

(56) References Cited

U.S. PATENT DOCUMENTS

| | | | | |
|---|---|---|---|---|
| 6,114,824 | A * | 9/2000 | Watanabe | B25J 9/1697 |
| | | | | 29/407.04 |
| 7,057,641 | B2 * | 6/2006 | Bodnar | G01J 3/02 |
| | | | | 348/188 |
| 8,139,138 | B1 * | 3/2012 | Tapes | G03B 13/00 |
| | | | | 348/345 |
| 8,223,208 | B2 * | 7/2012 | Alexander | G06K 9/209 |
| | | | | 348/187 |
| 9,307,232 | B1 * | 4/2016 | Warner | H04N 17/002 |
| 9,970,887 | B2 | 5/2018 | Matsumoto | |
| 2009/0162049 | A1 | 6/2009 | Maruyama | |
| 2014/0118503 | A1 * | 5/2014 | Luo | H04N 13/246 |
| | | | | 348/47 |
| 2016/0114486 | A1 * | 4/2016 | Huang | B25J 9/1692 |
| | | | | 700/254 |
| 2020/0213576 | A1 * | 7/2020 | Mosher | B33Y 50/02 |

FOREIGN PATENT DOCUMENTS

| | | | |
|---|---|---|---|
| JP | 2013221767 A | * | 10/2013 |
| JP | 2015-126288 A | | 7/2015 |
| JP | 2015126288 A | * | 7/2015 |
| JP | 2017-219478 A | | 12/2017 |

OTHER PUBLICATIONS

Office Action dated Mar. 25, 2021 issued in the corresponding Canadian Patent Application No. 3,067,802.

* cited by examiner

CAMERA FOCUS ADJUSTMENT JIG AND CAMERA FOCUS ADJUSTMENT METHOD

BACKGROUND OF THE INVENTION

Field of the Invention

The present invention relates to a camera focus adjustment jig fixed to a movable arm provided in a manufacturing line or the like, and a camera focus adjustment method of the same.

Description of the Related Art

Conventionally, it is known that coating is applied to an automobile body to form a coated film thereon in a manufacturing process of the automobile body (see Japanese Patent Application Publication No. 2017-219478, for example).

Coating defects may be caused in a coated film by bulges of approximately several tens of μm, and its appearance may be impaired when the coating defects occurs. For this reason, after the coated film is formed, the coated film is photographed with a camera to inspect presence or absence of coating defects.

SUMMARY OF THE INVENTION

When determining presence or absence of coating defects through photographing with a camera, it is necessary to focus the camera on the inspection target within a range as wide as the presence or absence of the defects can be distinguished. However, in the case in which the camera is fixed to a movable arm, it is necessary to not only move the movable arm to a position where the inspection target can be photographed with the camera based on a predetermined reference point of the movable arm, but also position the inspection target at a position where the inspection target can be photographed with the camera based on a predetermined reference point of the inspection target, and thereafter, the focus of the camera should be adjusted; therefore, such a case requires a tedious procedure.

In light of the above circumstances, an object of the present invention is to provide a camera focus adjustment jig and a camera focus adjustment method that can adjust focus of a camera more easily than those in the related art.

[1] In order to achieve the above object, the present invention provides a camera focus adjustment jig (e.g., a camera focus adjustment jig 1 of an embodiment; the same shall apply hereinafter) fixed to an inspection device (e.g., an inspection device of the embodiment; the same shall apply hereinafter) and adjusting a camera focus, the inspection device including a camera (e.g., a camera 5 of the embodiment; the same shall apply hereinafter) configured to photograph an inspection target (e.g., an automobile V of the embodiment; the same shall apply hereinafter), and a movable arm (e.g., a movable arm 3 of the embodiment; the same shall apply hereinafter) to which the camera is fixed via a fixing part (e.g., a fixing part 4 of the embodiment; the same shall apply hereinafter), the movable arm being configured to move the camera to a photographing position where the inspection target is photographed, the camera focus adjustment jig including:

a connection arm (e.g., a connection arm 6 of the embodiment; the same shall apply hereinafter) connected to the fixing part;

an adjusting unit (e.g., an adjusting unit 7 of the embodiment; the same shall apply hereinafter) provided on the connection arm and positioned, with respect to the camera, at a position equivalent to a position of the inspection target located at the photographing position; and a display part (e.g., display parts 9a, 9b of the embodiment; the same shall apply hereinafter) provided on a surface of the adjusting unit facing the camera.

According to the present invention, it is possible to position the adjusting unit using the fixing part as the reference point, and also adjust the focus of the camera using the fixer part as the reference point. Therefore, it is unnecessary to separately position the movable arm and the inspection target at their respective different reference points, as in the prior art; and the focus of the camera can be adjusted without moving the movable arm to the photographing position where the inspection target present on the manufacturing line or the like is photographed; accordingly, the camera focus adjustment can be more easily performed, as compared with the related art.

[2] In the present invention, the surface of the adjusting unit facing the camera may be provided with a step (e.g., a step 8a of the embodiment; the same shall apply hereinafter); and the display part may be provided in plurality at different distances with respect to the camera via the step.

According to such a configuration, since the plurality of display parts having different distances from each camera via the step are provided, it is possible to set, on the inspection target, a focal region as wide as defects can be appropriately distinguished.

[3, 4] In the present invention, a plurality of the cameras may be fixed to the fixing part;

the adjusting unit may be provided with a plurality of view angle frames (e.g., view angle frames 10a to 10c of the embodiment; the same shall apply hereinafter) in accordance with the number of cameras; and the display part may be provided in each of the view angle frames.

According to such a configuration, the view angles of the plurality of cameras can be adjusted appropriately, and the focus adjustment of the plurality of cameras can be simultaneously performed.

[5] A camera focus adjustment method of the present invention is a camera focus adjustment method used for an inspection device and adjusting a camera focus, the inspection device including a camera configured to photograph an inspection target, and a movable arm to which the camera is fixed via a fixing part, the movable arm being configured to move the camera to a photographing position where the inspection target is photographed, the camera focus adjustment method including:

a preparation process of positioning, via a connection arm connected to the fixing part, an adjusting unit provided on the connection arm, at a position equivalent to a position of the inspection target located at the photographing position;

a view angle adjustment process of adjusting a view angle of the camera in a view angle frame provided on a surface of the adjusting unit facing the camera; and a focus adjustment process of adjusting a focus of the camera such that a distance between the camera and a display part provided on the surface of the adjusting unit facing the camera becomes appropriate.

According to the present invention, it is possible to position the adjusting unit using the fixing part as its reference point, and also carry out the camera focus adjustment using the fixing part as its reference point. Therefore, it is unnecessary to separately position the movable arm and the inspection target with respect to their respective reference points, as in the prior art, and even without moving the movable arm to a photographing position where the inspection target present on a manufacturing line or the like is photographed, the focus of the camera can be adjusted on the current spot by the adjusting unit; thus, it is possible to facilitate the camera focus adjustment, as compared with the related art.

DETAILED DESCRIPTION OF THE PREFERRED EMBODIMENT

Figure 1:
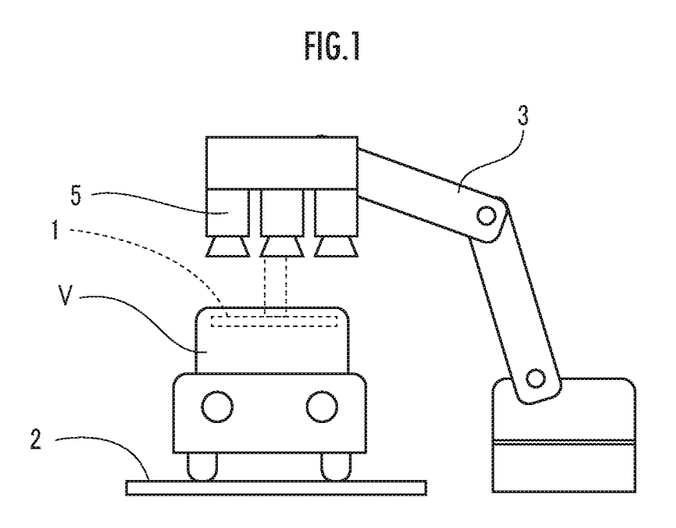
FIG. 1 is a schematic view showing a manufacturing line of an embodiment of the invention.

A camera focus adjustment jig according to an embodiment of the invention will be described with reference to the drawings. As shown in FIG. 1, the camera focus adjustment jig 1 of the present embodiment is used for an inspection device for inspecting defects of a coated film of an automobile V, and is a jig for adjusting focuses of three cameras 5 fixed to a fixing part 4 of a movable arm 3 such as a robot arm disposed on a manufacturing line 2 of the automobile V (which may also be a part of the automobile V). In the present embodiment, the inspection device is configured by the movable arm 3, the fixing part 4, the cameras 5, and illumination (not shown). For convenience of explanation, FIG. 1 shows the camera focus adjustment jig 1, but when the focus adjustment is actually performed with the camera focus adjustment jig 1 attached, the focus adjustment can be performed without moving the movable arm 3 to a photographing position shown in FIG. 1.

Figure 2:
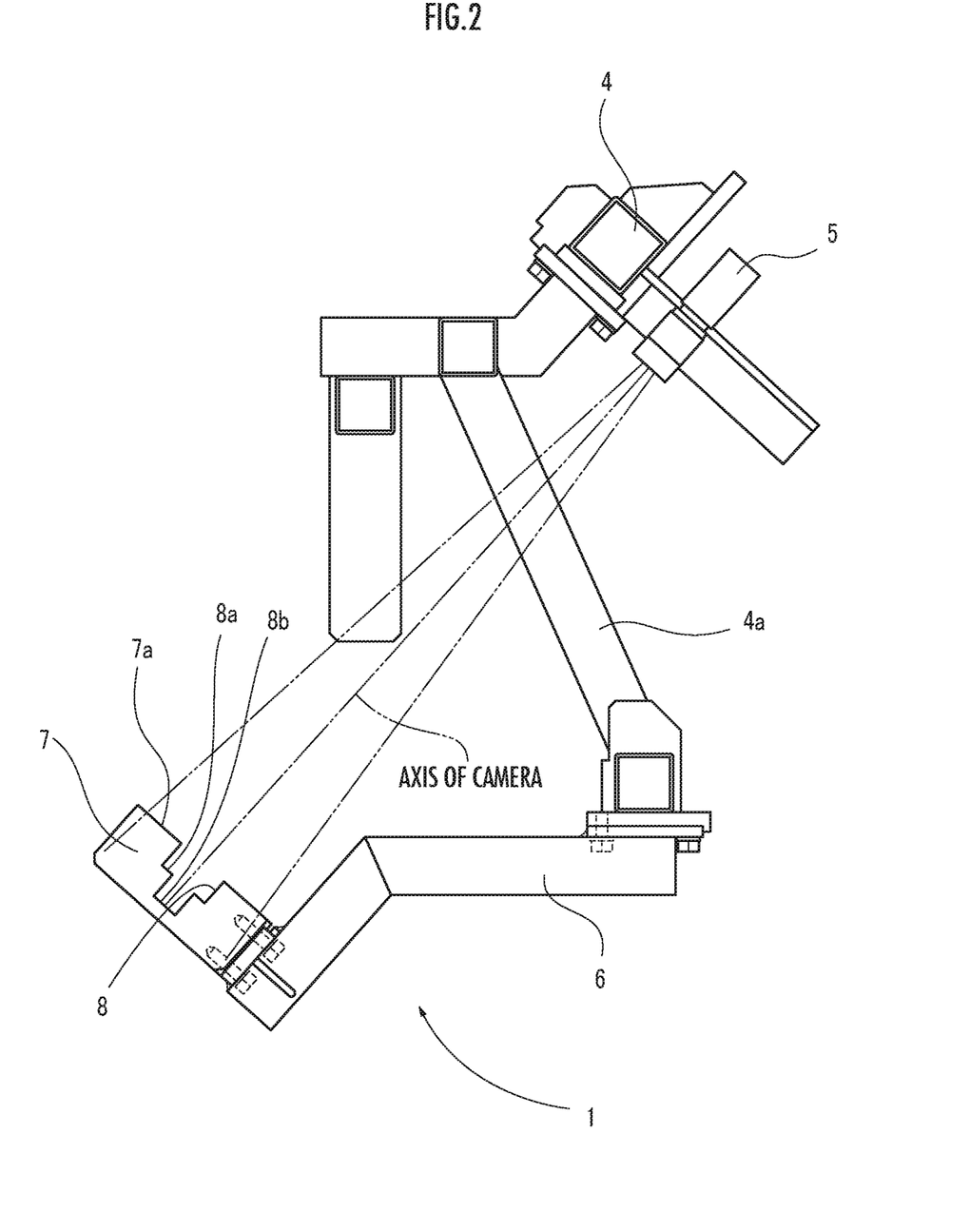
FIG. 2 is an explanatory view showing a camera focus adjustment jig of the present embodiment from a lateral direction.
Figure 3:
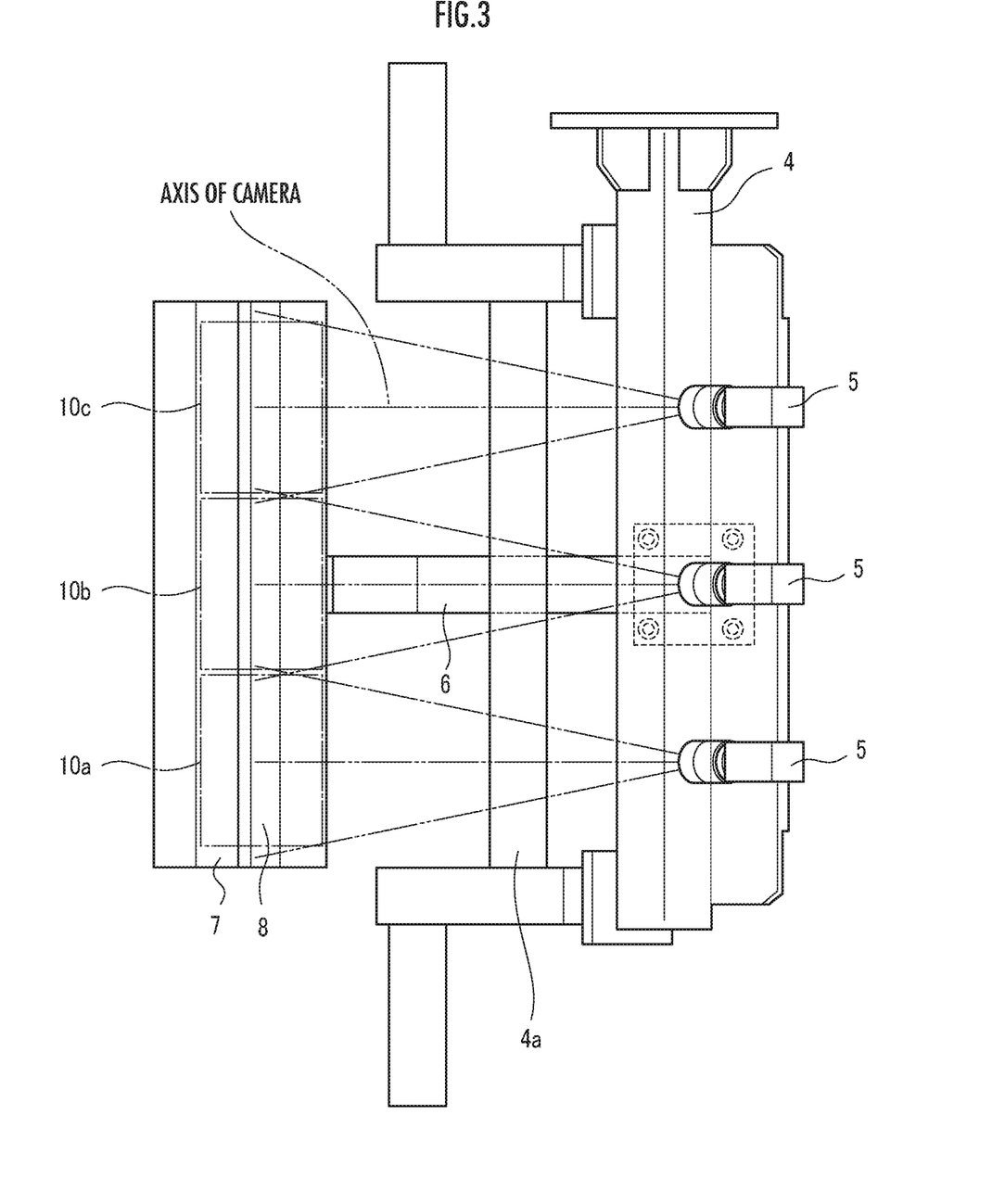
FIG. 3 is an explanatory view showing the camera focus adjustment jig of the present embodiment from above.

FIG. 2 shows the fixing part 4 of the movable arm 3, the three cameras 5 fixed to the single fixing part 4, and the camera focus adjustment jig 1, from the lateral direction. The fixing part 4 of the present embodiment includes a rectangular frame part 4a disposed around the axes of the cameras 5 so as to avoid the axes of the cameras 5 (see FIG. 3). A marking device (not shown) for applying a mark such as defects of the coated film to the automobile V is fixed to the rectangular frame part 4a.

With reference to FIG. 2, a base end of a connection arm 6 of the camera focus adjustment jig 1 extending frontward is fixed with bolts to a lower end of the rectangular frame part 4a of the fixing part 4 in a state in which respective faces of the base end and the lower end overlap each other. An adjusting unit 7 in a rectangular parallelepiped-shape is provided at a front end of the connection arm 6.

Figure 4:
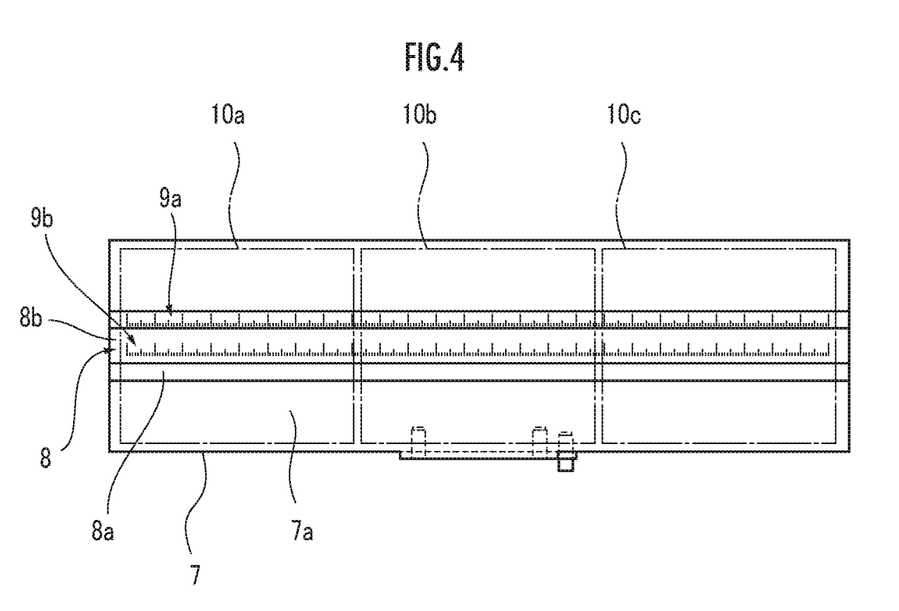
FIG. 4 is an explanatory view showing an adjusting unit of the present embodiment from above.
Figure 5:
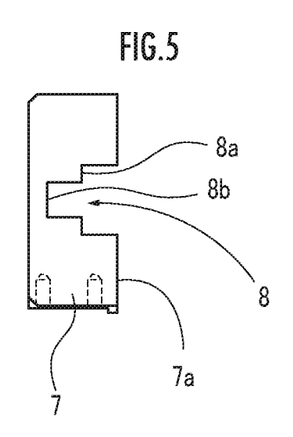
FIG. 5 is an explanatory view showing the adjusting unit of the present embodiment from the lateral direction.

FIG. 4 shows the adjusting unit 7 from the axial direction of the camera 5, and FIG. 5 shows the adjusting unit 7 from the lateral direction. As shown in FIG. 4 and FIG. 5, a two-step groove 8 including a step 8a is provided on a facing surface 7a of the adjusting unit 7 located on the side facing the camera 5. The step of the present invention is not limited to the step 8a of the two-stepped groove 8; and for example, the adjusting unit 7 may be provided with a single-step groove, and an edge portion of the single-step groove may be used as a step. Moreover, in the present invention, it is unnecessary to form the groove. In this case, a display part may be formed on the facing surface 7a of the adjusting unit 7.

The step 8a is provided with a first display part 9a having a scale pattern, and a bottom 8b of the two-step groove 8 is provided with a second display part 9b having a scale pattern similarly to the first display part 9a. In the present embodiment, the first display part 9a and the second display part 9b correspond to the display part "provided in plural at different distances with respect to the camera via the step" of the present invention. Note that the display parts of the present invention are not limited to ones each having a scale pattern, and may be those of other types as long as they serve as a reference when the focusing is carried out, and for example, they have characters, numbers, symbols, or the like. Furthermore, a third display part may be provided on the facing surface 7a.

The facing surface 7a of the adjusting unit 7 is provided with a first view angle frame 10a, a second view angle frame 18b, and a third view angle frame 10c arranged in the longitudinal direction. The first view angle frame 10a, the second view angle frame 18b, and the third view angle frame 10c are arranged side by side so as to coincide with the respective view angle of the three cameras 5.

Figure 6:
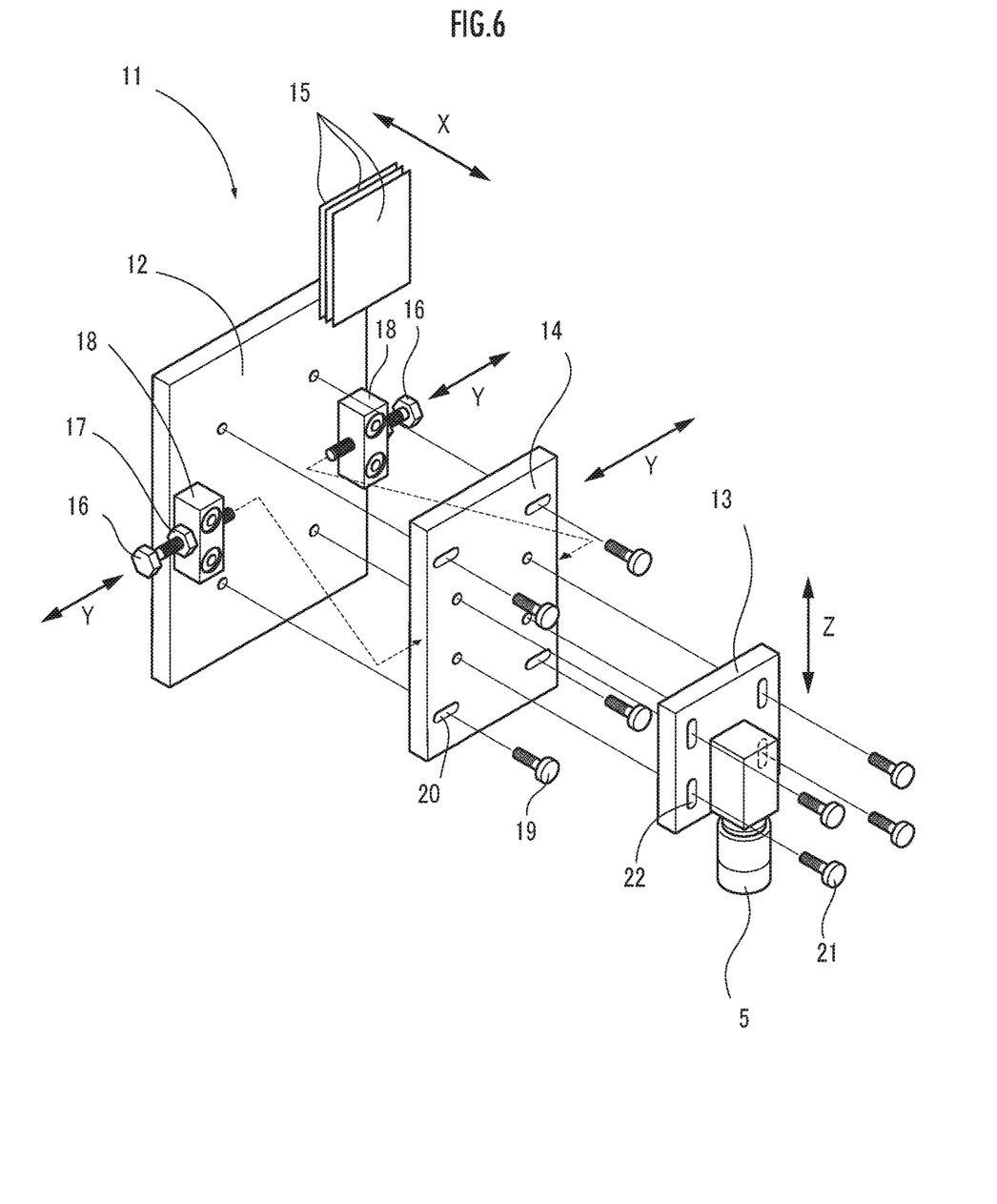
FIG. 6 is an explanatory view showing a focus adjustment structure of the camera of the present embodiment, in an exploded state.

FIG. 6 shows an exploded view of a view angle adjusting mechanism 11, which is provided on the fixing part 4 and is configured to adjust the view angle of each of the cameras 5 such that the respective view angles of the cameras 5 are set appropriately with respect to the respective view angle frames 10a to 10c of the adjusting unit 7.

With reference to FIG. 6, the view angle adjusting mechanism 11 includes: a base 12 fixed to the fixing part 4; a fixing plate 13 to which the camera 5 is fixed; and a slide plate 14 disposed between the base 12 and the fixing plate 13. Shims 15 can be inserted between the base 12 and the slide plate 14, and the view angle in a plate thickness direction X of the fixing plate 13 can be adjusted by adjusting the number of shims 15 to be inserted.

The base 12 is provided with two Y-axis adjustment bolts 16 each having a front end that can abut to a side edge (in a lateral direction Y in FIG. 6) of the slide plate 14. Each Y-axis adjusting bolt 16 is screwed to a female screw 17 of a block 18 that has the female screw 17 and is provided on the base 12. When the Y-axis adjusting bolt 16 is rotated, the Y-axis adjusting bolt 16 moves forward or backward in the lateral direction Y. By using the forward-backward movement of the Y-axis adjusting bolt 16, it is possible to adjust the position in the lateral direction Y of the slide plate 14 with respect to the base 12 so as to adjust the view angle in the lateral direction Y.

The slide plate 14 is fixed to the base 12 with bolts 19, and insertion holes 20 through which the bolts 19 of the slide plate 14 are inserted are each drilled to be formed in a long hole shape elongated in the lateral direction Y in FIG. 6 so as to allow the slide plate 14 to move in the lateral direction Y with respect to the base 12.

The fixing plate 13 is fixed to the slide plate 14 with bolts 21, and insertion holes 22 through which the bolts 21 of the fixing plate 13 are inserted are each drilled to be formed in a long hole shape elongated in the vertical direction Z in FIG. 6 so as to allow the fixing plate 13 to move in the vertical direction Z with respect to the slide plate 14.

Next, the focus adjustment method of the cameras 5 will be described. [Preparation Process]

First, as a preparation process, the connection arm 6 is connected to the fixing part 4. At this time, the connection arm 6 is set such that the adjusting unit 7 provided on the front end of the connection arm 6 is positioned at a distance coinciding with a distance between each camera 5 when the movable arm 3 is moved on the manufacturing line 2 and a coated film (painted film) of the automobile V. In other words, the adjusting unit 7 provided on the connection arm 6 via the connection arm 6 connected to the fixing part 4 is positioned at a position equivalent to a position of the vehicle V as the inspection target located at the photographing position with each camera 5.

[View Angle Adjustment Process]

Next, as a view angle adjustment process, the view angle adjusting mechanism 11 is adjusted such that the respective view angles of the cameras 5 match the respective view angle frames 10a to 10c provided on the surface of the adjusting unit 7 facing the cameras 5.

[Focus Adjustment Process]

Next, as a focus adjustment process, the focus of each camera 5 is adjusted such that a distance between the camera 5 and the display parts 9a, 9b provided on the surface of the adjusting unit 7 facing the camera 5 becomes appropriate. At this time, it may be enough to focus the camera 5 on the plurality of display parts 9a, 9b such that defects of the coated film can be checked.

According to the camera focus adjustment jig 1 of the present embodiment, the adjusting unit 7 can be arranged using the fixing part 4 as its reference point, and the focus of the camera 5 can be adjusted using the fixing part 4 as its reference point. Therefore, it is unnecessary to separately perform positioning of the movable arm and the inspection target at the respective reference points, as in the related art. Hence, the focus of each of the cameras 5 can be also adjusted by the adjusting unit 7 on its current spot without moving the movable arm 3 to the photographing position where the vehicle V as the inspection target present on the manufacturing line 2 or the like is photographed. Accordingly, as compared with the related art, it is possible to more readily perform the focus adjustment of the cameras 5 with respect to the adjusting unit 7 based on the single reference point that is the fixing part 4.

In addition, since there are provided the plurality of display portions 9a, 9b that have respective different distances from the cameras 5 via the step, it is possible to appropriately set the focal region as wide as defects of the coated film can be distinguished, with respect to the automobile V as the inspection target.

In addition, it is possible to appropriately adjust the respective view angles of the plurality of cameras 5, and it is also possible to perform the focus adjustment of the plurality of cameras simultaneously with the operation of adjustments of the view angles; therefore, compared with the case of separately performing the adjustment of the view angle and the focus adjustment, the operation of the adjustment of the cameras 5 can be facilitated.

REFERENCE SIGNS LIST

1 CAMERA FOCUS ADJUSTMENT JIG
2 MANUFACTURING LINE
3 MOVABLE ARM
4 FIXING PART
4A RECTANGULAR FRAME PART
5 CAMERA
6 CONNECTION ARM
7 ADJUSTING UNIT
7A FACING SURFACE
8 TWO-STEP GROOVE
8A S1BP
8B BOTTOM
9A FIRST DISPLAY PART
9B SECOND DISPLAY PART
10A FIRST VIEW ANGLE FRAME
10B SECOND VIEW ANGLE FRAME
10C THIRD VIEW ANGLE FRAME
11 VIEW ANGLE ADJUSTING MECHANISM
12 BASE
13 FIXING PLA1B
14 SLIDE PLA1B
15 SHIM
16 Y-AXIS ADJUSTING BOLT
17 FEMALE SCREW
18 BLOCK
19 BOLT
20 INSERTION HOLE
21 BOLT
22 INSERTION HOLE
V AUTOMOBILE
X PLA1B THICKNESS DIRECTION OF FIG. 6
Y LA FERAL DIRECTION OF FIG. 6
Z VERTICAL DIRECTION OF FIG. 6

What is claimed is:

1. A camera focus adjustment jig fixed to an inspection device and configured to adjust a camera focus of a plurality of cameras, the inspection device including
    said plurality of cameras, each configured to photograph an inspection target, and
    a movable arm to which the cameras are fixed via a fixing part, the movable arm being configured to move the cameras to a photographing position where the inspection target is photographed,
the camera focus adjustment jig comprising:
    a connection arm connected to the fixing part;
    an adjusting unit provided on the connection arm and positioned, with respect to the cameras, at a position equivalent to a position of the inspection target located at the photographing position; and
    a number of display parts equal to a number of cameras in the plurality of cameras, the display parts provided on a surface of the adjusting unit facing the cameras, each of the display parts corresponding to one of the cameras;
wherein:
    the surface of the adjusting unit, facing the cameras, is provided with a step and the display parts are situated at different distances from the cameras via the step,
    the adjusting unit is provided with a plurality of view angle frames corresponding to the number of cameras; and each of the view angle frames is associated with one of the display parts.

2. A camera focus adjustment jig fixed to an inspection device and configured to adjust a camera focus of a plurality of cameras, the inspection device including said plurality of cameras, each configured to photograph an inspection target, and a movable arm to which the cameras are fixed via a fixing part, the movable arm being configured to move the cameras to a photographing position where the inspection target is photographed, the camera focus adjustment jig comprising:

a connection arm connected to the fixing part;

an adjusting unit provided on the connection arm and positioned, with respect to the camera, at a position equivalent to a position of the inspection target located at the photographing position; and a display part provided on a surface of the adjusting unit facing the camera, wherein:

the adjusting unit is provided with a plurality of view angle frames in accordance with a number of cameras in the plurality of cameras; and the display part is provided in each of the view angle frames.

3. A camera focus adjustment method used for an inspection device and adjusting a camera focus of a plurality of cameras, the inspection device including a plurality of cameras, each configured to photograph an inspection target, and a movable arm to which the cameras are fixed via a fixing part, the movable arm being configured to move the cameras to a photographing position where the inspection target is photographed, the camera focus adjustment method comprising:

a preparation process of positioning, via a connection arm connected to the fixing part, an adjusting unit provided on the connection arm, at a position equivalent to a position of the inspection target located at the photographing position, wherein the adjusting unit is provided with a plurality of view angle frames corresponding to a number of cameras in the plurality of cameras;

a view angle adjustment process of adjusting a view angle of each of the cameras in a respective one of the view angle frames provided on a surface of the adjusting unit facing the camera, each of the view angle frames comprising a display part; and a focus adjustment process of adjusting a focus of each of the cameras, respectively, such that a distance between the camera and a corresponding one of said display parts, provided on the surface of the adjusting unit facing the camera, becomes appropriate.

* * * * *